W. J. CHANCE.
DUMPING CAR.
APPLICATION FILED MAY 20, 1908.

914,925.

Patented Mar. 9, 1909.
2 SHEETS—SHEET 1.

Witnesses

Inventor
William J. Chance
By Chandlee & Chandlee
Attorneys

W. J. CHANCE.
DUMPING CAR.
APPLICATION FILED MAY 20, 1908.
914,925.
Patented Mar. 9, 1909.
2 SHEETS—SHEET 2.
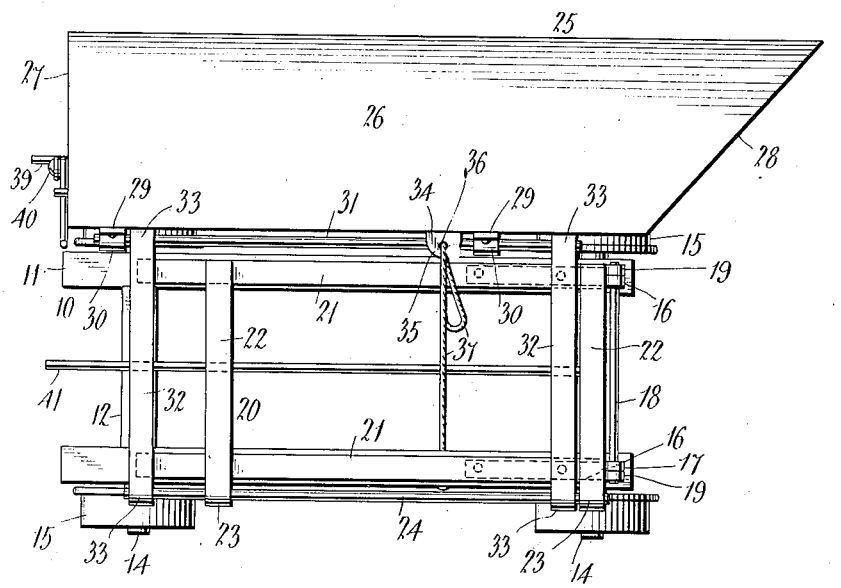
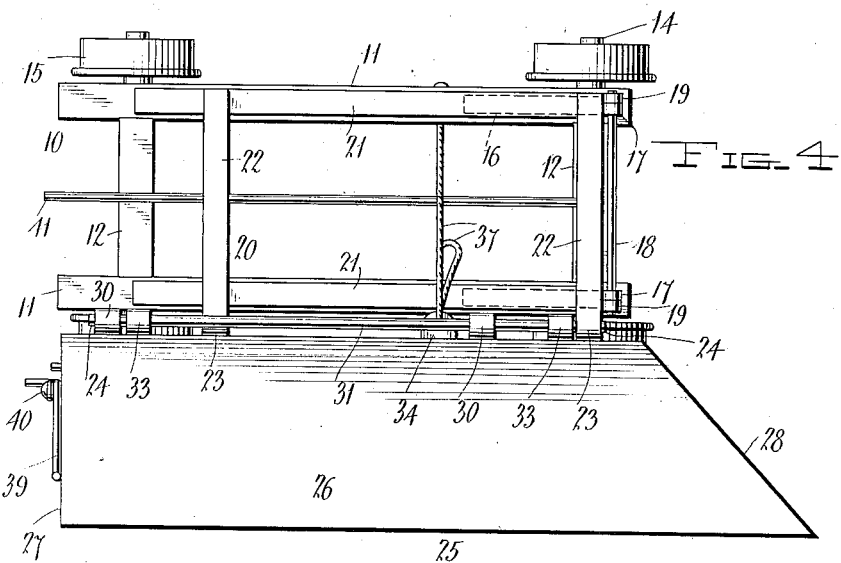
Witnesses
Inventor
William J. Chance
By Chandlee & Chandlee
Attorneys

UNITED STATES PATENT OFFICE.

WILLIAM J. CHANCE, OF DAWSON, YUKON TERRITORY, CANADA.

DUMPING-CAR.

No. 914,925.      Specification of Letters Patent.      Patented March 9, 1909.

Application filed May 20, 1908. Serial No. 433,922.

*To all whom it may concern:*

Be it known that I, WILLIAM JEFFERSON CHANCE, a subject of the King of Great Britain, residing at Dawson, in Yukon Territory, Dominion of Canada, have invented certain new and useful Improvements in Dumping-Cars; and I do hereby declare the following to be a full, clear, and exact description of the invention, such as will enable others skilled in the art to which it appertains to make and use the same.

The invention relates to dumping cars, and more particularly to railway and tramway trucks having a dumping body adapted to be tilted at one end of the truck and at opposite sides thereof.

The primary object of the invention is the provision of a dumping car having connecting means with a body for transporting and discharging materials, said body capable of being tilted to permit its contents to be discharged from opposite sides of the car and from one end thereof.

Another object of the invention is the provision of a wheeled truck frame having mounted thereon a tilting body capable of dumping material contained therein at opposite sides of the truck frame and at one end thereof, and locking means carried by the latter and cooperative with the body to prevent the same from dumping sidewise while it is free to dump endwise.

A further object of the invention is the provision of a dumping car having a dumping body supported upon a wheeled truck frame and pivoted connections between the same to permit side and end tilting of said body on the truck frame, and furthermore, coöperative locking means to hold the body against tilting sidewise when free for end tilting of the same.

In the accompanying drawings forming part of this specification is illustrated in detail one advantageous form of embodiment of the invention which, to enable those skilled in the art to practice said invention, will be set forth at length in the following description, while the novelty of the invention will be included in the claims succeeding said description.

Figure 1:
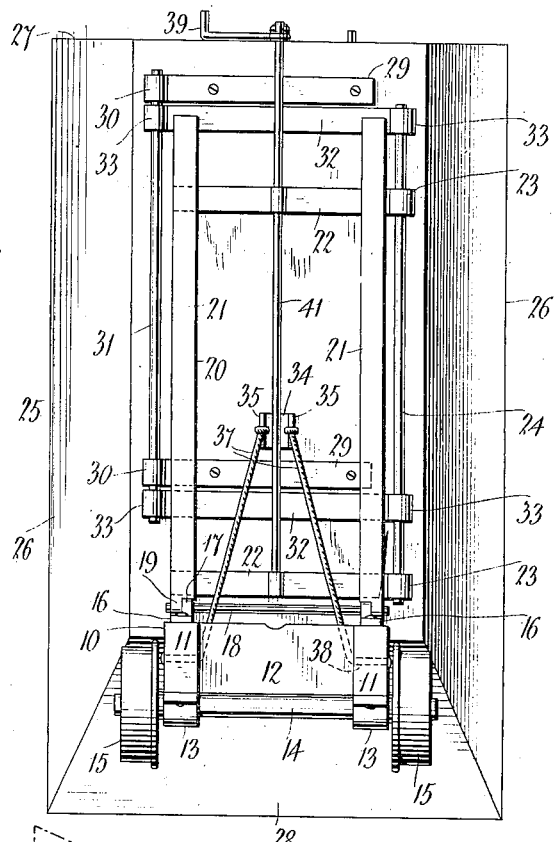
Figure 2:
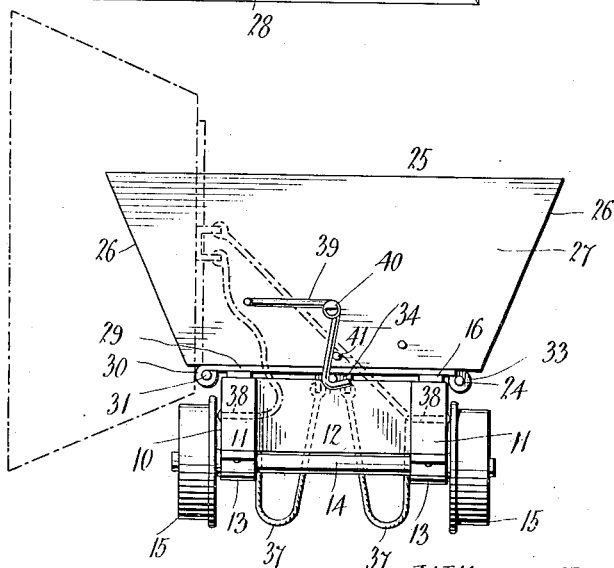

In the drawings:—Figure 1 is an end view of the dumping car, showing the body tilted at the front end thereof. Fig. 2 is a rear end view showing the dumping or tilting body locked against side tilting thereof and capable of being tilted at its front end. Fig. 3 is a plan view of the dumping car with its body tilted or dumping at one side of the same. Fig. 4 is a similar view showing the body tilted to the opposite side of the dumping car.

Similar reference characters represent corresponding parts throughout the several views in the drawings.

In the drawings the numeral 10, designates a truck frame having side sections 11, and transverse end sections 12, connected thereto, and to the under side of the truck frame 10, near opposite ends thereof are connected bearings 13, having journaled therein axles 14, carrying car wheels 15, of the usual type. At the forward end of the truck frame 10, are mounted hinge sections 16, having forwardly projecting eye terminals 17, receiving a pivot pin or shaft 18, engaging eye terminals 19, forming hinge connections with a frame section 20, of substantially corresponding shape to the truck frame 10, and adapted to normally rest upon the same. The frame section 20 includes flat side bars 21, having rigid connection with flat end bars 22, the latter extended forwardly a distance beyond one side of the frame section 20, and forming bearing loops or eye terminals 23, in which is mounted a pivot rod or pin 24, extending longitudinally in parallel relation with the adjacent side bar 21, of the frame section.

In superposed relation to the frame section 20, is a dumping body or receptacle 25, having outwardly diverging side walls 26, a vertical rear end wall 27, and a forwardly inclined front wall 28, with respect to said end wall. To the bottom of the body or receptacle 25, at its outer face is connected strap hinge sections 29, disposed transversely thereof and extended in close proximity to one side wall 26, at a point opposite the pivot rod 24. Said strap hinge sections 29, at their ends adjacent the side wall 26, opposite the pivot rod 24, are provided with loop terminals or eyes 30, receiving a pivot pin or rod 31, extending longitudinally of the bottom of said receptacle 25.

Hingedly connected to the pivot rod 31, and the pivot rod 24, are link members 32, having opposite loop terminals or eyes 33, surrounding the pivot rods respectively to form a hinge connection therewith.

Centrally of the bottom of the body or receptacle 25, and secured thereto is a plate 34, being bent on itself at opposite ends at right angles thereto to form depending lugs 35, or ears, having openings 36, which receive flexible connections 37, such as ropes or chains, the free ends of which are connected to said lugs and the opposite free ends pass through openings 38, in the side bars or sections 11, of the truck frame and secured thereto. It is clearly apparent that when the body or receptacle 25, is tilted upon the truck frame 10, to either side of the same the flexible connections 37, will limit the tilting movement of said body, and furthermore will hold the body 25, in its tilted position.

On the outer face of the vertical rear end wall 27, of the body 25, is a manually operable latch member 39, pivoted thereto as at 40, and adapted for locking engagement with a rod 41, connected centrally to the end bars 22, and extending longitudinally of the frame section 20, whereby when the locking latch member 39, is in engagement with the rod 41, the body or receptacle 25, is prevented from tilting sidewise on either side of the truck frame 10, however, said body is free for forward dumping or tilting endwise on the latter.

In operation and presuming that the receptacle or body 25, contains material which is desired to be dumped from the forward end of the truck frame 10, and to accomplish this purpose the locking member 39, must be in engagement with the rod 41, and by bodily raising the rear end extremity of the body or receptacle 25, it will be caused to tilt by being swung upon the pivot pin or shaft 18, carried by the frame section 20, which latter is held locked to the said body or receptacle by the latch member and moves therewith. Now should it be desired to tilt the body or receptacle 25, so as to discharge its contents at either side of the truck frame it is necessary to release the latch member 39, from engagement with the rod 41, whereby said body is free to be tipped or tilted on the pivot rods 24 and 31 respectively.

What is claimed is:—

1. A dumping car of the class described comprising a wheeled truck, a frame section hinged at the forward end of said truck and a body hinged to said frame section at one longitudinal side edge thereof.

2. A dumping car of the class described comprising a truck, a section hinged to said truck to permit endwise swinging movement thereof, a body hinged to said frame section to permit side tilting of said body and means to lock the frame section against movement upon the side tilting of the body.

3. A dumping car comprising a wheeled truck frame, a frame section hingedly connected at one end thereof, a body, and links hingedly connected to the body and to the frame section.

4. A dumping car comprising a wheeled truck, a frame section, means pivotally connecting the frame section to the truck to permit endwise swinging movement of said section, a body, links pivotally connected to the body and to the frame section, to permit the said body to swing to opposite sides of the truck, means for limiting the swinging movement of the body to opposite sides of the truck, and means for locking the body with the frame section.

5. A dumping car comprising a wheeled truck frame, a frame section having one end pivotally connected to one end of the truck frame, a tilting body disposed above said frame section, means connecting the body to the frame section to permit said body to tilt to opposite sides of the truck frame, and means for locking the body to the frame section to permit said body to tilt at one end of the truck frame.

In testimony whereof, I affix my signature, in presence of two witnesses.

WILLIAM J. CHANCE.

Witnesses:
 THOMAS L. FIRTH,
 G. C. COLE.